United States Patent [19]
Nagai

[11] Patent Number: 5,743,086
[45] Date of Patent: Apr. 28, 1998

[54] DEVICE FOR JUDGING DETERIORATION OF CATALYST OF ENGINE

[75] Inventor: Toshinari Nagai, Shizuoka, Japan

[73] Assignee: Toyota Jidosha Kabushiki Kaisha, Toyota, Japan

[21] Appl. No.: 734,543

[22] Filed: Oct. 21, 1996

[30] Foreign Application Priority Data

Oct. 26, 1995 [JP] Japan ................. 7-279002

[51] Int. Cl.⁶ ....................... F01N 3/20; F02D 41/14
[52] U.S. Cl. ........................... 60/276; 60/277
[58] Field of Search ....................... 60/276, 277, 285

[56] References Cited

U.S. PATENT DOCUMENTS

| | | | |
|---|---|---|---|
| 5,279,116 | 1/1994 | Shimizu et al. | 60/277 |
| 5,301,501 | 4/1994 | Shimizu et al. | 60/274 |
| 5,359,853 | 11/1994 | Shimizu et al. | 60/276 |
| 5,377,484 | 1/1995 | Shimizu et al. | 60/276 |
| 5,400,592 | 3/1995 | Mukaihira et al. | 60/277 X |
| 5,412,941 | 5/1995 | Shimizu et al. | 60/276 |
| 5,636,514 | 6/1997 | Seki | 60/277 |

*Primary Examiner*—Tony M. Argenbright
*Attorney, Agent, or Firm*—Oliff & Berridge, PLC

[57] ABSTRACT

A device for judging the deterioration of a three-way catalyst comprising an upstream $O_2$ sensor and a downstream $O_2$ sensor which are arranged in the exhaust passage upstream and downstream of the three-way catalyst respectively. When the ratio of length of the output signal response curve of the downstream $O_2$ sensor and the length of the output signal response curve of the upstream $O_2$ sensor is over a threshold level, it is judged that the three-way catalyst has deteriorated. The threshold value is reduced as the mean value of the air-fuel ratio becomes off from the stoichiometric air-fuel ratio.

8 Claims, 18 Drawing Sheets

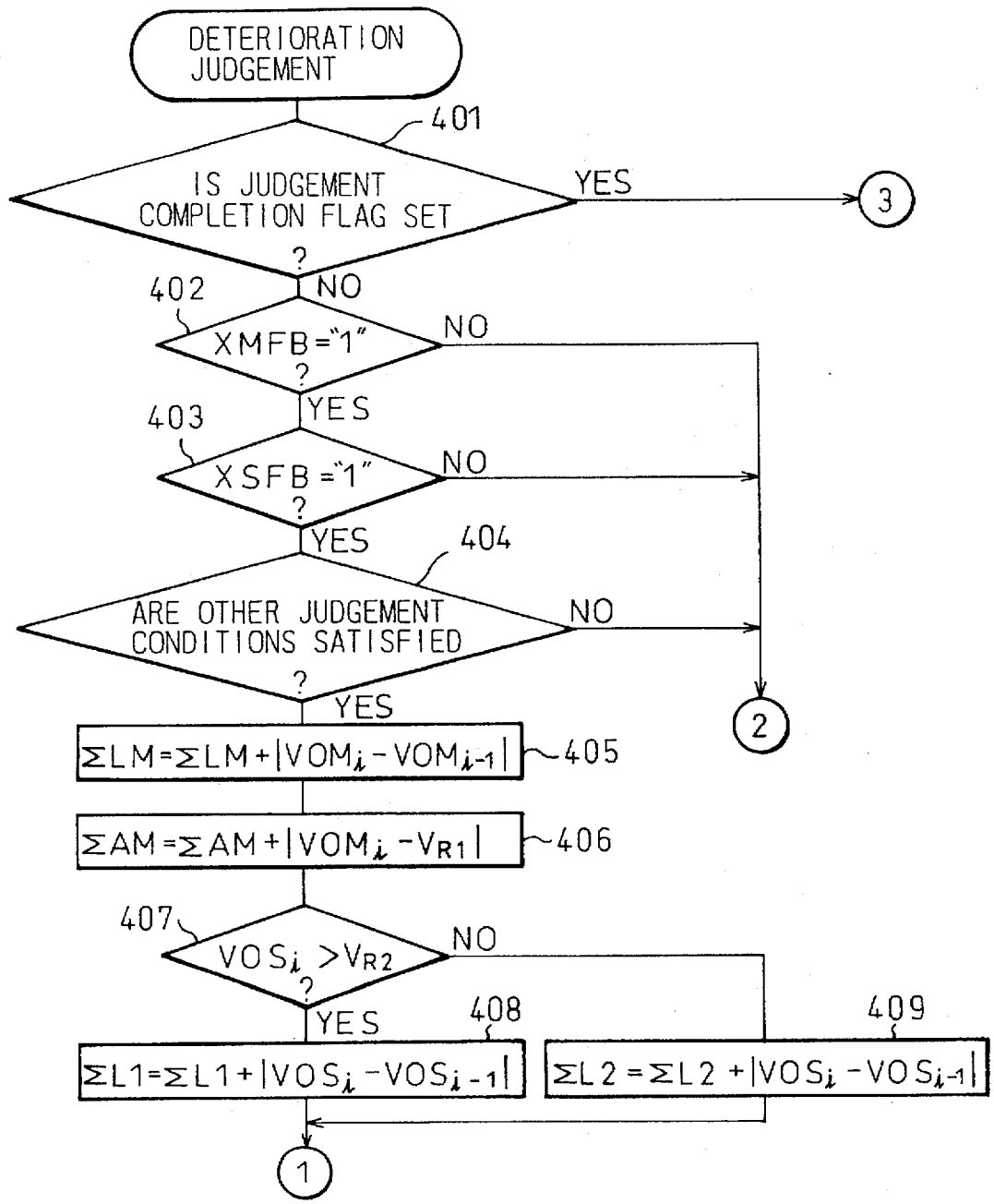

DEVICE FOR JUDGING DETERIORATION OF CATALYST OF ENGINE

BACKGROUND OF THE INVENTION

1. Field of the Invention

The present invention relates to a device for judging the deterioration of a catalyst of an engine.

2. Description of the Related Art

Known in the art is an internal combustion engine in which a three-way catalyst is arranged in the engine exhaust passage, an upstream air-fuel ratio sensor is arranged inside the engine exhaust passage upstream of the three-way catalyst, a downstream air-fuel ratio sensor is arranged in the engine exhaust passage downstream of the three-way catalyst, the air-fuel ratio is controlled to the stoichiometric air-fuel ratio based on the output signal of the upstream air-fuel ratio sensor and the downstream air-fuel ratio sensor, and the three-way catalyst is judged to have deteriorated when the amount of fluctuation of the sensor output, which fluctuates together with the fluctuation of the output of the downstream air-fuel ratio sensor and increases the greater the deterioration of the three-way catalyst, exceeds a predetermined set value (see Japanese Unexamined Patent Publication (Kokai) No. 5-163989). In this internal combustion engine, as the amount of fluctuation of the sensor output, use is made of the ratio of the length, that is, the ratio of the length of the output signal response curve (hereinafter referred to as the length of the output) of the upstream air-fuel ratio sensor and the length of the output of the downstream air-fuel ratio sensor.

That is, the three-way catalyst has an $O_2$ storage function, that is, absorbs and stores the excess oxygen contained in the exhaust gas when the air-fuel ratio is lean. Accordingly, if the air-fuel ratio is controlled by feedback to the stoichiometric air-fuel ratio, that is, if the air-fuel ratio is alternately switched from lean to rich about the stoichiometric air-fuel ratio, when the air-fuel ratio is lean, the excess oxygen contained in the exhaust gas is absorbed, so the $NO_x$ is reduced, while when the air-fuel ratio becomes lean, the oxygen absorbed and stored in the three-way catalyst is used for the oxidation of the unburnt hydrocarbons and carbon monoxide, so the unburnt hydrocarbons, carbon monoxide, and $NO_x$ are simultaneously purified.

When the unburnt hydrocarbons, carbon monoxide, and $NO_x$ are being purified well by the oxygen storage function possessed by the three-way catalyst, the air-fuel ratio at the downstream side of the three-way catalyst, that is, the air-fuel ratio detected by the downstream side air-fuel ratio, does not change that much. Accordingly, the output of the downstream side air-fuel ratio sensor does not fluctuate that much either. However, if the oxygen storage function weakens, that is, the three-way catalyst deteriorates, the action of reduction of the $NO_x$ and the action of oxidation of the unburnt hydrocarbons and carbon monoxide are no longer sufficiently performed, so the fluctuation in the output of the downstream side air-fuel ratio sensor becomes greater. Accordingly, the larger the amount of fluctuation of the output of the downstream side air-fuel ratio sensor, the more deteriorated the three-way catalyst. Therefore, in the above-mentioned internal combustion engine, when the amount of fluctuation of the output of the downstream air-fuel ratio sensor exceeds a predetermined set value, it is judged that the three-way catalyst has deteriorated.

However, the amount of fluctuation of the output of the downstream air-fuel ratio sensor becomes smaller the more the air-fuel ratio is deviated from the stoichiometric air-fuel ratio. Accordingly, when judging that the three-way catalyst has deteriorated merely when the amount of fluctuation of the output of the downstream air-fuel ratio exceeds the predetermined set value as mentioned above, when the air-fuel ratio deviates from the stoichiometric air-fuel ratio overall and thereby the amount of fluctuation of the downstream sensor becomes smaller, there is the problem that the three-way catalyst is mistakenly judged to not have deteriorated despite the three-way catalyst having deteriorated.

SUMMARY OF THE INVENTION

An object of the present invention is to provide a device for judging the deterioration of a catalyst which is capable of correctly detecting the deterioration of the catalyst even if the center of fluctuation of the air-fuel ratio deviates from the stoichiometric air-fuel ratio.

According to the present invention, there is provided a device for judging the deterioration of a three-way catalyst arranged in an exhaust passage of an engine in which an air-fuel ratio is controlled by feedback operation so that it becomes equal to the stoichiometric air-fuel ratio, the device comprising a downstream air-fuel ratio sensor arranged in the exhaust passage downstream of the three-way catalyst; fluctuation calculating means for calculating an amount of fluctuation of sensor output, which changes in accordance with a change in the amount of fluctuation of an output of the downstream air-fuel ratio sensor and increases as the three-way catalyst deteriorates; deterioration judging means for judging that the three-way catalyst deteriorates when the amount of fluctuation of the sensor output exceeds a predetermined amount of fluctuation; air-fuel ratio deviation judging means for judging whether or not a mean value of the air-fuel ratio deviates from the stoichiometric air-fuel ratio; and controlling means for controlling the predetermined amount of fluctuation on the basis of a judgement by the air-fuel ratio deviation judging means to lower the predetermined amount of fluctuation when the mean value of the air-fuel ratio deviates from the stoichiometric air-fuel ratio.

BRIEF DESCRIPTION OF THE DRAWINGS

The present invention may be more fully understood from the description of preferred embodiments of the invention set forth below, together with the accompanying drawings, in which:

FIGS. 16 and 17 are flow charts of a first embodiment for judging the deterioration of the three-way catalyst.

DESCRIPTION OF THE PREFERRED EMBODIMENTS

Figure 1:
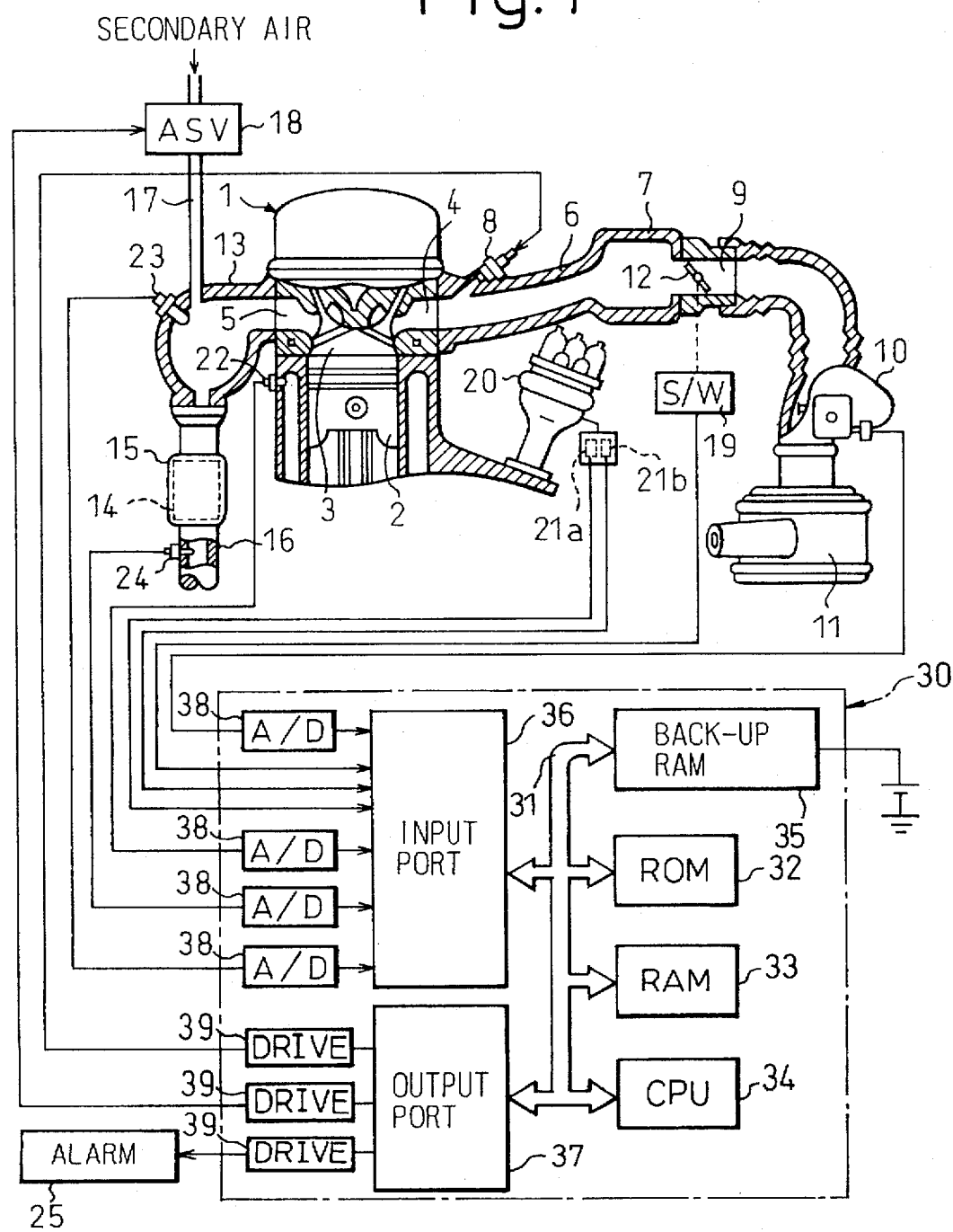
FIG. 1 is an overview of an internal combustion engine.

Referring to FIG. 1, 1 is an engine body, 2 is a piston, 3 is a combustion chamber, 4 is an intake port, and 5 is an exhaust port. The intake port 4 is connected through an intake pipe 6 to a surge tank 7. Each intake pipe 6 is provided with a fuel injector 8 injecting fuel toward the inside of the corresponding intake port 4. The surge tank 7 is connected through an intake duct 9 and air flow meter 10 to an air cleaner 11. Inside the intake duct 9 is arranged a throttle valve 12. On the other hand, the exhaust port 5 is connected to an exhaust manifold 13. This exhaust manifold 13 is connected to an exhaust pipe 16 through a catalytic converter 15 housing a three-way catalyst 14 able to simultaneously reduce the amounts of the unburnt hydrocarbons, carbon monoxide, and $NO_x$ in the exhaust gas. The exhaust manifold 14 is connected to a secondary air feed conduit 17. In the secondary air feed conduit 17 is arranged a secondary air feed control valve 18.

An electronic control unit 30 is comprised of a digital computer which is provided with a read only memory (ROM) 32, random access memory (RAM) 33, central processing unit (CPU) 34, backup RAM 35 connected at all times to a power source, input port 36, and output port 37 connected with each other by a bidirectional bus 31. The air flow meter 10 generates an output voltage proportional to the amount of intake air. This output voltage is input through the corresponding AD converter 38 to the input port 36. The throttle valve 12 is provided with an idling switch 19 which generates an LL signal showing that the throttle valve 12 is opened to the idling position. The LL signal generated by the idling switch 19 is input to the input port 36.

A distributor 20 is provided with a top dead center sensor 21a generating a signal showing that for example the no. 1 cylinder is at the top dead center of the intake stroke and a crank angle sensor 21 generating an output pulse each time the crank shaft rotates by 30 degrees. The output signal of the top dead center sensor 21a and the output pulse of the crank angle sensor 21b are input to the input port 36. In the CPU 34, the current crank angle and the engine speed are calculated from the output signal of the top dead center sensor 21a and the output pulse of the crank angle sensor 21b. The engine body 1 is provided with a temperature sensor 22 for generating an output voltage proportional to the temperature of the engine coolant. The output voltage of the temperature sensor 22 is input through the corresponding AD converter 38 to the input port 36.

Inside the exhaust manifold 13 upstream of the three-way catalyst 14 is arranged an air-fuel ratio sensor 23 for detecting the air-fuel ratio from the concentration of oxygen in the exhaust gas. Inside the exhaust pipe 16 downstream of the three-way catalyst 14 is arranged an air-fuel ratio sensor 25 for detecting the air-fuel ratio from the concentration of oxygen in the exhaust gas. Note that the air-fuel ratio sensor 23 arranged at the upstream side of the three-way catalyst 13 is referred to below as the upstream $O_2$ sensor, while the air-fuel ratio sensor 24 arranged at the downstream side of the three-way catalyst 13 is referred to as the downstream $O_2$ sensor. The output signals of the upstream $O_2$ sensor 23 and the downstream $O_2$ sensor 24 are input through the corresponding AD converter 38 to the input port 36. On the other hand, the output port 37 is connected through the corresponding drive circuits 39 to the fuel injector 8, secondary air feed control valve 18, and alarm lamp, alarm buzzer, or other alarm device 25.

In the embodiment according to the present invention, the fuel injection time TAU is calculated based on the following equation:

$$TAU = TP \cdot FAF \cdot K + \gamma$$

Figure 2:
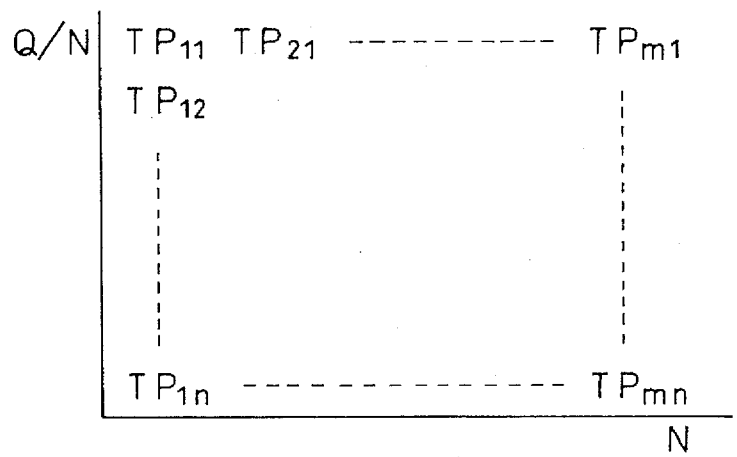
FIG. 2 is a view of a map of a basic fuel injection time TP.

Here, TP shows the basic fuel injection time, FAF the feedback correction coefficient, K the increase coefficient, and $\gamma$ the invalid injection time. The basic fuel injection time TP is the injection time required for making the air-fuel ratio the stoichiometric air-fuel ratio. This basic fuel injection time TP is found in advance by experiments as a function of the engine load Q/N (amount of intake air Q/engine speed N) and the engine speed N and is stored in advance in the ROM 32 in the form of a map as a function of the engine load Q/N and engine speed N as shown in FIG. 2.

Figure 3:
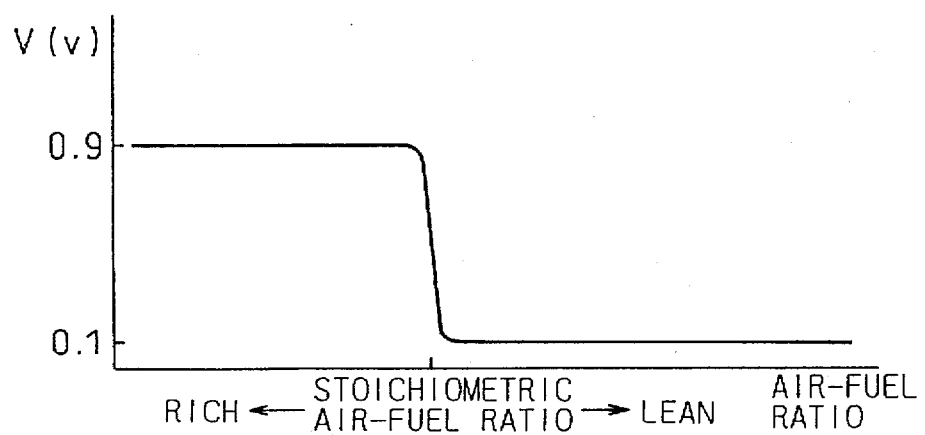
FIG. 3 is a graph of the output voltage of an $O_2$ sensor.

The feedback correction coefficient FAF is changed based on the output signal of the upstream $O_2$ sensor 23 so that the air-fuel ratio becomes the stoichiometric air-fuel ratio. This feedback correction coefficient FAF usually shifts up and down about 1.0. That is, the upstream $O_2$ sensor 23 generates an output voltage of about 0.1 V when the air-fuel ratio is lean as shown in FIG. 3 and generates an output voltage of about 0.9 V when the air-fuel ratio is rich. When it is judged from the output voltage of the upstream $O_2$ sensor 23 that the air-fuel ratio is lean, the feedback correction coefficient FAF is increased, while when it is judged that the air-fuel ratio is rich, the feedback correction coefficient FAF is reduced. As a result, the air-fuel ratio is controlled to the stoichiometric air-fuel ratio.

Note that in this embodiment of the present invention, the feedback correction coefficient FAF is further controlled based on the output signal of the downstream $O_2$ sensor 24. That is, when the center of fluctuation of the air-fuel ratio at the upstream side of the three-way catalyst 14 is off from the stoichiometric air-fuel ratio, the feedback correction coefficient FAF is judged based on the output signal of the downstream $O_2$ sensor 24 so that the center of fluctuation of the air-fuel ratio at the upstream side of the three-way catalyst 14 becomes close to the stoichiometric air-fuel ratio. The downstream $O_2$ sensor 24 also generates an output voltage of about 0.1 V when the air-fuel ratio is lean and generates an output voltage of about 0.9 V when the air-fuel ratio is rich as shown in FIG. 3.

The increase coefficient K is usually fixed to 1.0. When the fuel is to be increased, that is, when the air-fuel ratio is to be made rich, it becomes a value larger than 1.0.

Next, an explanation will be made of the routine for control of the feedback of the air-fuel ratio based on the output signal of the upstream $O_2$ sensor 23 referring to FIG. 4 and FIG. 5. Note that this routine is executed by interruption every predetermined time period, for example, every 4 ms.

Figure 4:
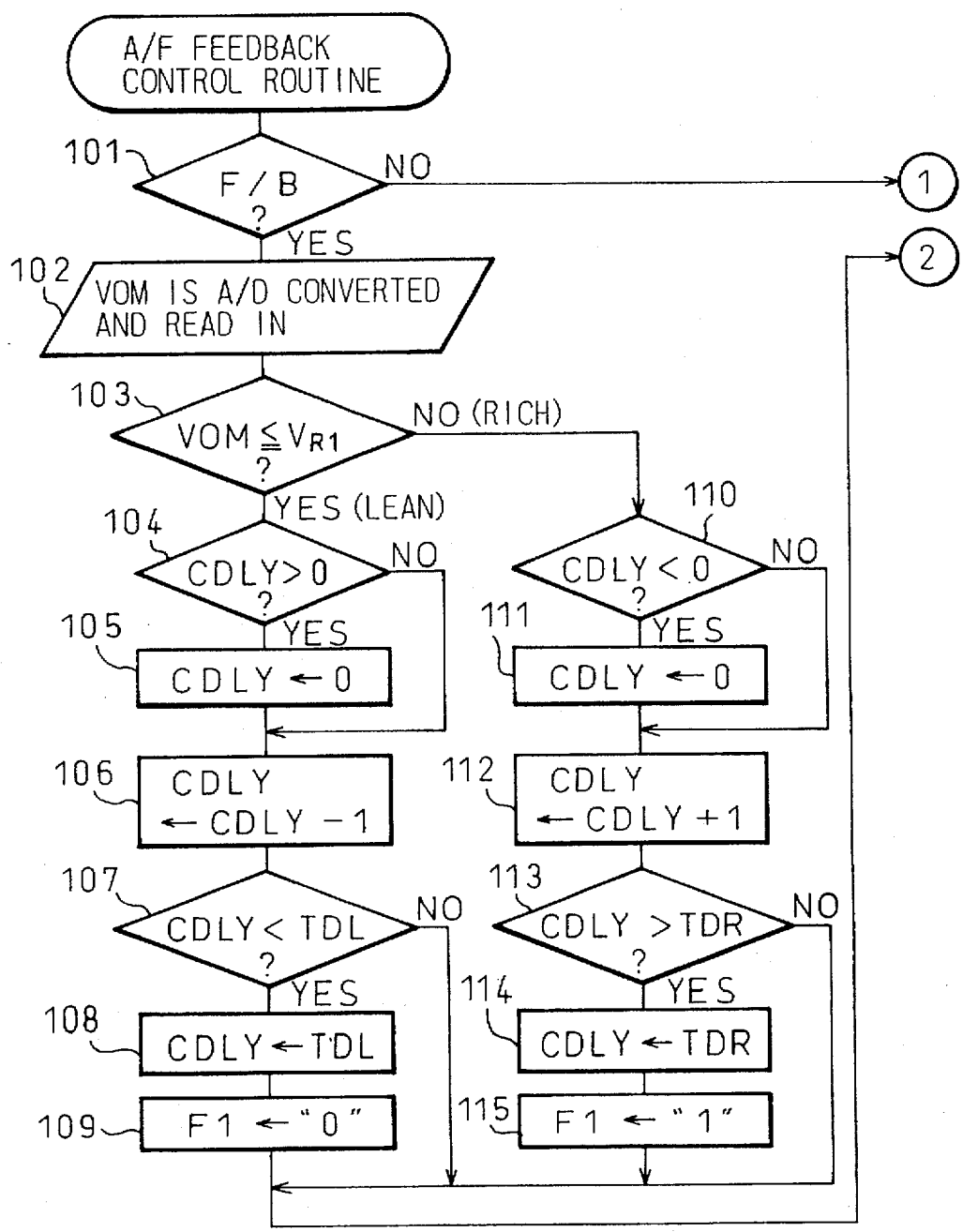
FIGS. 4 and 5 are flow charts of the feedback control of the air-fuel ratio.
Figure 5:
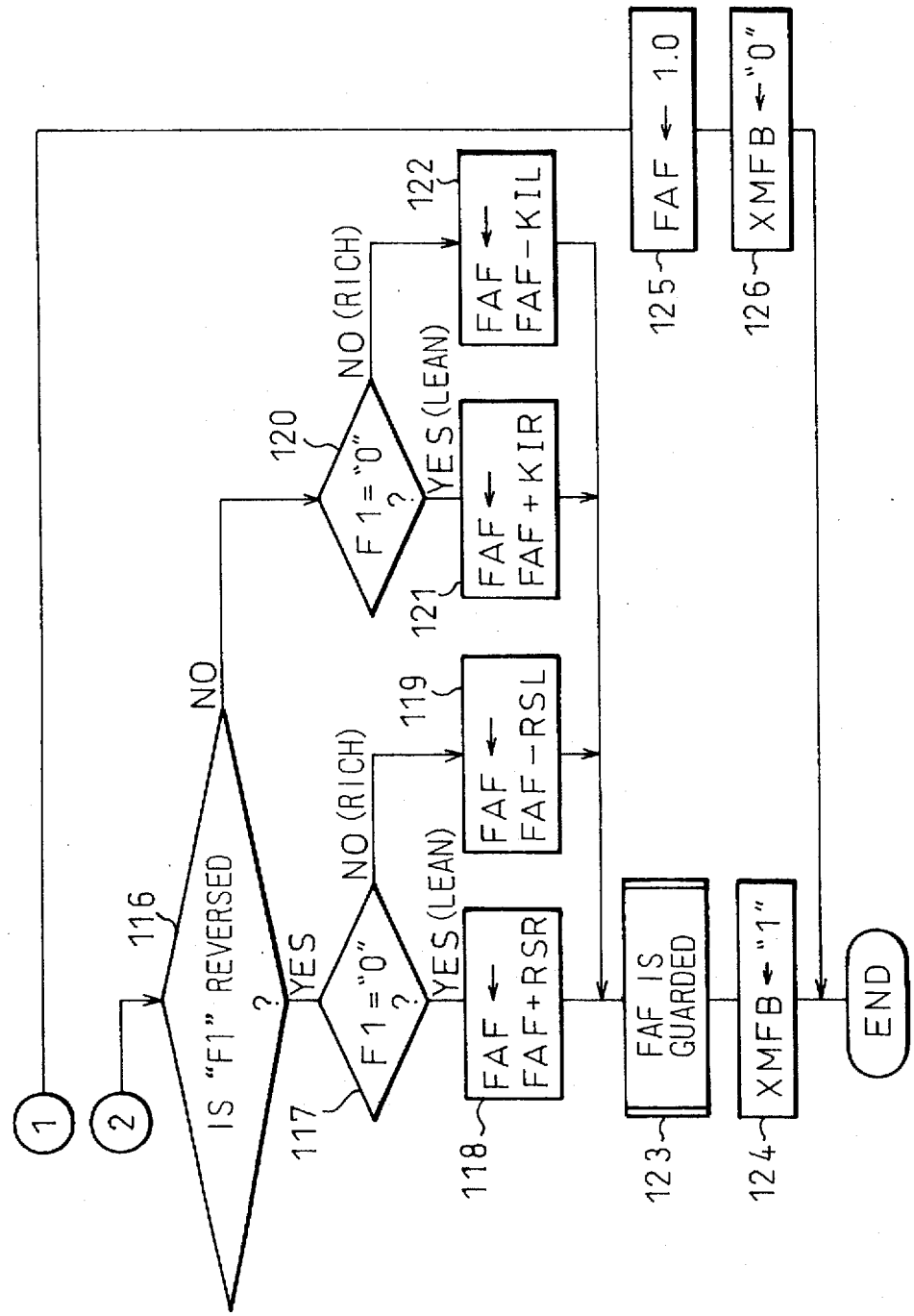
Figure 6A:
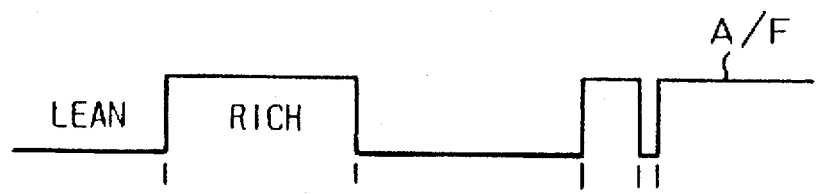
FIGS. 6(A)–6(D) show a time chart of changes in the values involved in the feedback control.
Figure 6B:
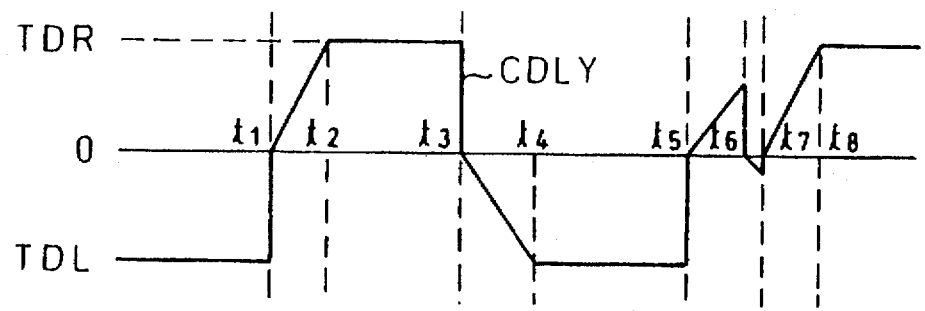
Figure 6C:
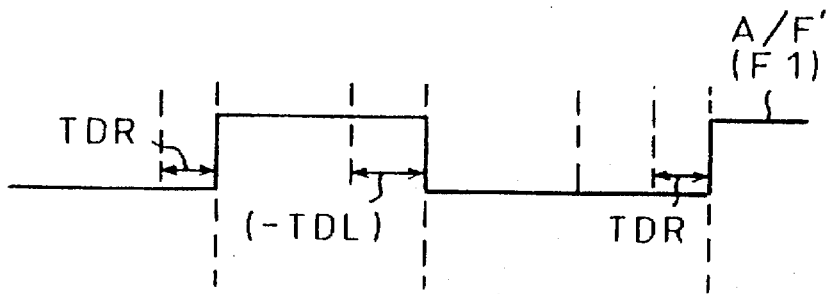
Figure 6D:
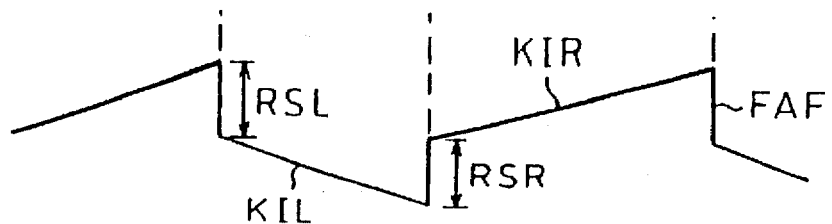

Referring to FIG. 4 and FIG. 5, first, at step 101, it is judged if the feedback conditions of the air-fuel ratio by the upstream $O_2$ sensor 23 are satisfied or not. It is judged that the feedback conditions are not satisfied when the temperature of the engine coolant is less than the set value, during engine startup, increasing injection immediately after startup, increasing injection during warmup, increasing injection during power operation, increasing injection for preventing catalyst overheating, when the upstream $O_2$ sensor 23 is not activated, and when fuel injection is stopped during deceleration. When the feedback conditions are not satisfied, the routine proceeds to step 125, where the feedback correction coefficient FAF is made 1.0, then at step 126, the air-fuel ratio feedback flag XMFB is made "0". As opposed to this, when the feedback conditions are satisfied, the routine proceeds to step 102.

At step 102, the output VOM of the upstream $O_2$ sensor 23 is converted from an analog to digital format and fetched, then at step 103 it is judged if the air-fuel ratio is rich or lean based on whether the VOM is lower than the relative voltage $V_{R1}$. This relative voltage $V_{R1}$ is made the voltage of the center of amplitude of the $O_2$ sensor output and in this embodiment is $V_{R1}$=0.45 V. When it is judged at step 103 that the air-fuel ratio is lean (VOM$\geq V_{R1}$), the routine proceeds to step 104, where it is judged if the delay counter CDLY is positive or not. If CDLY>0, then at step 105 CDLY is made 0, then the routine proceeds to step 106. At step 106, the delay counter CDLY is decremented by exactly "1", then at steps 107 and 108, the delay counter CDLY is guarded by the minimum value TDL. In this case, when the delay counter CDLY reaches the minimum value TDL, the air-fuel ratio flag F1 is made "0" (lean) at step 109. Note that this minimum value TDL is a negative value. On the other hand, when it is judged at step 103 that the air-fuel ratio is rich (VOM>$V_{R1}$), the routine proceeds to step 110, where it is judged if the delay counter CDLY has been made "0". If CDLY<0, then the CDLY is made 0 at step 111, then the routine proceeds to step 112. At step 112, the delay counter CDLY is incremented by exactly "1", then at steps 113 and 114, the delay counter CDLY is guarded by the maximum value TDR. In this case, when the delay counter CDLY reaches the maximum value TDR, the air-fuel ratio flag F1 is made "1" (rich) at step 115. Note that this maximum value TDR is a positive value. Next, at step 116, it is judged if the sign of the air-fuel ratio flag F1 has inverted or not. When the air-fuel ratio is inverted, the routine proceeds to step 117, where it is judged if it inverted from rich to lean or inverted from lean to rich based on the air-fuel ratio flag F1. If inverted from rich to lean, at step 118, FAF is increased in skips as FAF←FAF+RSR, while as opposed to this, if inverted from lean to rich, at step 119, the FAF is reduced in skips as FAF←FAF−RSL. That is, the skip processing is performed.

On the other hand, when it is judged at step 116 that the sign of the air-fuel ratio flag F1 has not been inverted, processing for integration is performed at steps 120, 121, and 122. That is, at step 120, it is judged if F1="0". If F1="0" (lean), then at step 121, FAF←FAF+KIR, while if F1="1" (rich), at step 122, FAF←FAF−KIL. Here, the integration constants KIR and KIL are set sufficiently smaller than the skip amounts RSR and RSL so that KIR (KIL)<RSR (RSL). When F1="0" (lean) due to this integration processing, the amount of fuel injection is gradually increased, while when F1="1" (rich), the amount of fuel injection is gradually reduced.

Next, at step 123, the feedback correction coefficient FAF computed at steps 118, 119, 121, and 122 is guarded by the minimum value, for example, 0.8 or guarded by the maximum value, for example, 1.2. Due to this, when for some reason or another the feedback correction coefficient FAF becomes too large or too small, the air-fuel ratio of the engine is kept from fluctuating and thereby the air-fuel ratio is prevented from becoming overly rich or overly lean. Next, at step 124, the air-fuel ratio feedback flag XMFB is made "1".

FIG. 6 is a timing chart for explaining the operation by the flow charts of FIG. 4 and FIG. 5. If the rich and lean judgement air-fuel ratio signal A/F shown in FIG. 6(A) is obtained from the output VOM of the upstream $O_2$ sensor 23, the delay counter CDLY is counted up in the rich state and counted down in the lean state as shown in FIG. 6(B). As a result, as shown in FIG. 6(C), the delayed air-fuel ratio signal A/F' (corresponding to the flag F1) is formed. For example, even if the air-fuel ratio signal A/F is changed from lean to rich at the time $t_1$, the air-fuel ratio signal A/F' is kept lean for exactly the rich delay time TDR, then is changed to rich at the time $t_2$. Further, even if the air-fuel ratio A/F is changed from rich to lean at the time $t_3$, the air-fuel ratio signal A/F' is kept rich for exactly the lean delay time (-TDL), then changed to lean at the time $t_4$. However, if the air-fuel ratio signal A/F is inverted in a shorter time than the rich delay time TDR as shown by the times $t_5$, $t_6$, and $t_7$, it will take time for the delay counter CDLY to reach the maximum value TRD and, as a result, the air-fuel ratio signal A/F' will be inverted at the time $t_8$. That is, the delayed air-fuel ratio signal A/F' becomes stable compared with the air-fuel ratio signal A/F before the delay processing. In this way, a feedback correction coefficient FAF shown in FIG. 6(D) is obtained based on the delayed and stabilized air-fuel ratio signal A/F'.

Next, an explanation will be made of the second air-fuel ratio feedback control by the downstream $O_2$ sensor 24. As the second air-fuel ratio feedback control, there is the system of controlling the constants involved in the first air-fuel ratio feedback control, that is, the skip amounts RSR and RSL, the integration constants KIR and KIL, the delay times TDR and TDL, or the relative voltage $V_{R1}$ of the upstream $O_2$ sensor 23 and the system of introducing a second air-fuel ratio correction coefficient FAF2.

For example, when the rich skip amount RSR is made larger, the control air-fuel ratio can be shifted to the rich side. Further, even when the lean skip amount RSL is made small, the control air-fuel ratio can be shifted to the rich side. On the other hand, when the lean skip amount RSL is made larger, the control air-fuel ratio can be shifted to the lean side. Further, even when the rich skip amount RSR is made small, the control air-fuel ratio can be shifted to the lean side. Accordingly, it is possible to control the air-fuel ratio by correcting the rich skip amount RSR and lean skip amount RSL in accordance with the output of the downstream $O_2$ sensor 24. Further, if the rich integration constant K is made larger, the control air-fuel ratio can be shifted to the rich side. Further, even when the lean integration constant KIL is made small, the control air-fuel ratio can be shifted to the rich side. On the other hand, if the lean integration constant KIL is made large, the control air-fuel ratio can be shifted to the lean side. Further, even if the rich integration constant KIR is made smaller, the control air-fuel ratio can be shifted to the lean side. Accordingly, by correcting the rich integration constant KIR and the lean integration constant KIL in accordance with the output of the downstream $O_2$ sensor 24, it becomes possible to control the air-fuel ratio. Further, if the rich delay time TDR is made larger or the lean delay time (-TDL) is made smaller, the control air-fuel ratio can be shifted to the rich side, while if the lean delay time (-TDL) is made larger or the rich delay time (TDR) is made smaller, the control air-fuel ratio can be shifted to the lean side. Further, if the relative voltage $V_{R1}$ is made larger, the control air-fuel ratio can be shifted to the rich side, while when the relative voltage $V_{R1}$ is made smaller, the control air-fuel ratio can be shifted to the lean side. Accordingly, by correcting the relative voltage $V_{R1}$ in accordance with the output VOS of the downstream $O_2$ sensor 24, it becomes possible to control the air-fuel ratio.

There are advantages to controlling the skip amount, integration constant, delay time, and relative voltage by the downstream $O_2$ sensor 24. For example, by controlling the delay time, it becomes possible to extremely finely adjust the air-fuel ratio, while by controlling the skip amount, control with a good response becomes possible without lengthening the feedback period of the air-fuel ratio. Note that these control amounts can naturally be used in combination.

Next, an explanation will be made of the double $O_2$ sensor system designed to control the amount of skip as a constant involved in the air-fuel ratio feedback control.

Figure 7:
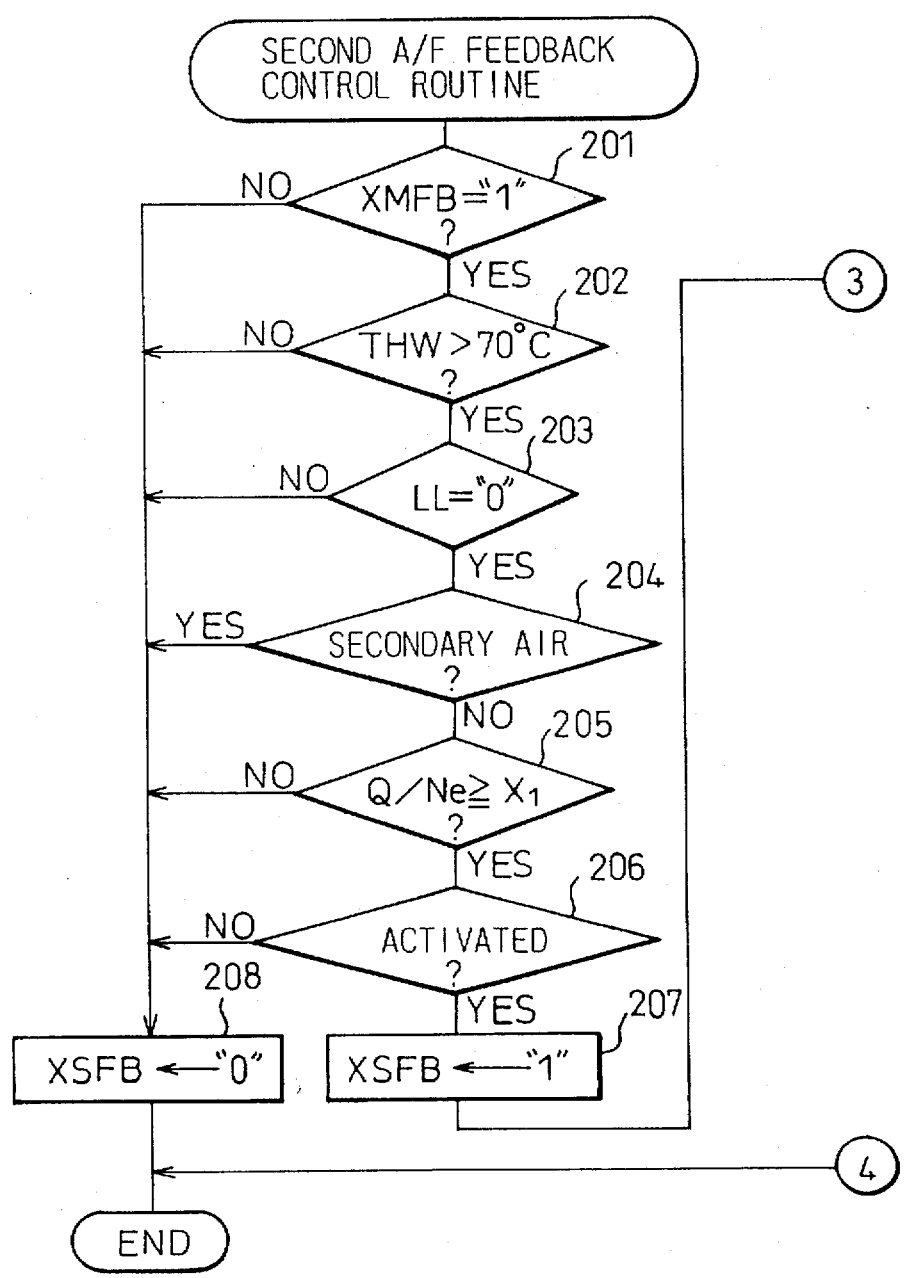
FIGS. 7 and 8 are flow charts of the feedback control of the air-fuel ratio.
Figure 8:
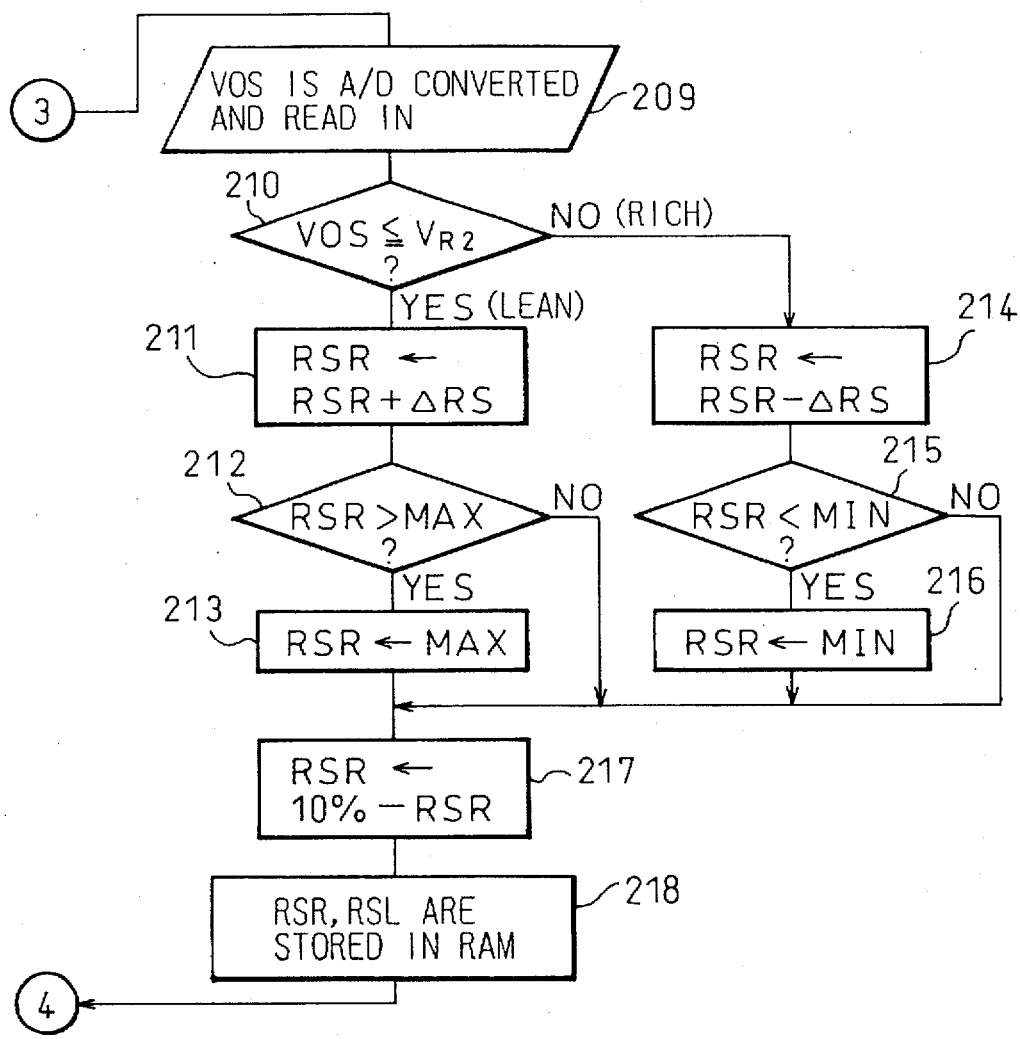

FIG. 7 and FIG. 8 show the second air-fuel ratio feedback control routine based on the output VOS of the downstream $O_2$ sensor 24 executed by interruption every predetermined time interval, for example, 512 ms. From step 201 to 206, it is judged if the conditions for feedback by the upstream 02 sensor 23 are satisfied or not. For example, when the conditions for feedback by the upstream $O_2$ sensor 23 are not satisfied (step 201), when the coolant temperature THW is less than a set value (for example, 70° C.) (step 202), when the throttle valve 22 is open to the idling position (LL="1") (step 203), when the secondary air is introduced based on the engine speed, vehicle speed, signal LL of the idle switch, coolant temperature THW, etc. (step 204), when the load is light (Q/N<$X_1$) (step 205), and when the downstream $O_2$ sensor 24 is not activated (step 206), it is judged that the conditions for feedback are not satisfied, while in other cases, it is judged that the conditions for feedback are satisfied. When the conditions for feedback are not satisfied, the routine proceeds to step 208, the air-fuel ratio feedback flag XSFB is reset ("0"), while when the conditions for feedback are satisfied, the routine proceeds to step 207, where the air-fuel ratio feedback flag XSFB is set ("1"), then the routine proceeds to step 209.

At step 209, the output VOS of the downstream $O_2$ sensor 24 is converted from an analog to digital format and fetched, then at step 210, it is judged if the VOS is less than the relative voltage $V_{R2}$ (for example, $V_{R2}$=0.55 V) or not, that is, if the air-fuel ratio is rich or lean. When it is judged at step 210 that VOS≤$V_{R2}$ (lean), the routine proceeds to steps 211, 212, and 213, while when it is judged that VOS>$V_{R2}$ (rich), the routine proceeds to steps 214,215, and 216. That is, at step 211, RSR←RSR+ΔRS (constant value), that is, the amount of rich skip RSR is increased to make the air-fuel ratio shift to the rich side, then at steps 212 and 213 the RSR is guarded by the maximum value MAX (=7.5%). On the other hand, at step 214, RSR←RSR−ΔRS, that is, the amount of rich skip RSR is reduced to shift the air-fuel ratio to the lean side, then at steps 215 and 216, RSR is guarded by the minimum value MIN (=2.5%).

Next, at step 217, the amount of rich skip RSL is made RSL←10%−RSR. That is, RSR+RSL=10%. Next, at step 218, the skip amounts RSR and RSL are stored in the RAM 33.

Figure 9:
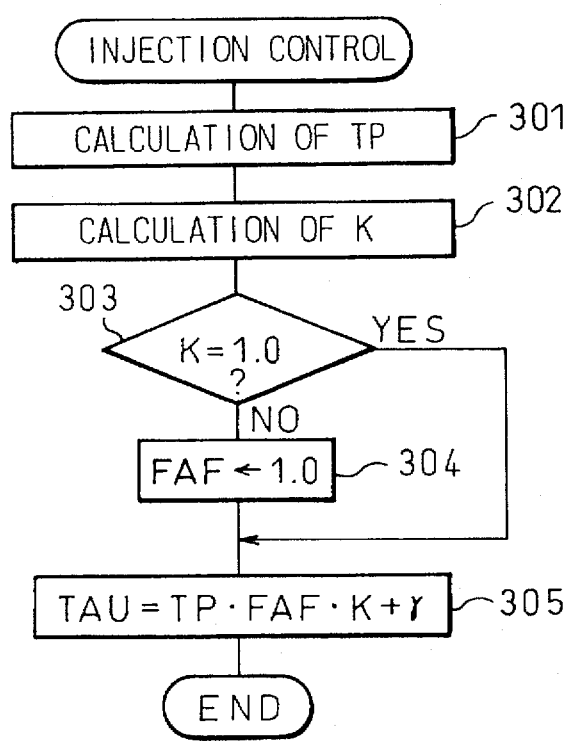
FIG. 9 is a flow chart of the control of the fuel injection.

FIG. 9 is a routine for control of the fuel injection executed by interruption every predetermined crank angle for example.

Referring to FIG. 9, first, at step 310, the basic fuel injection time TP is calculated from the map shown in FIG. 2. Next, at step 302, the value of the correction coefficient K determined from the operating state of the engine is calculated. Next, at step 303, it is judged if the value of the correction coefficient K is 1.0 or not. When K=1.0, the routine jumps to step 305. As opposed to this, when K is not equal to 1.0, the routine proceeds to step 304, where the feedback correction coefficient FAF is fixed to 1.0, then the routine proceeds to step 305. At step 305, the fuel injection time TAU (=TP·FAF·K+γ) is calculated.

Next, an explanation will be made of the basic method for judgement of the deterioration of the three-way catalyst 14 used in the present invention referring to FIG. 10A to FIG. 12C.

Figure 10A:
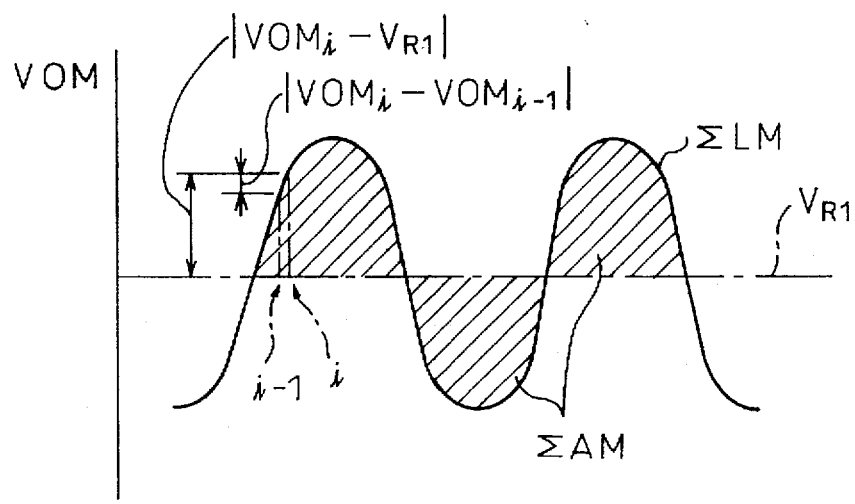
FIGS. 10A and 10B are views explaining the length and "area" of the output voltage of the $O_2$ sensor ("area" meaning the area surrounded by the output signal response curve and a reference value line, same below)
Figure 10B:
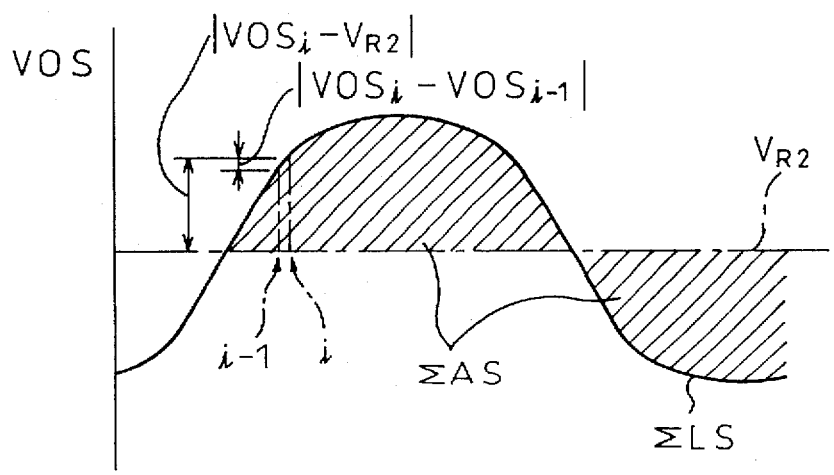

FIG. 10A shows the output voltage VOM of the upstream $O_2$ sensor 23 when feedback control of the air-fuel ratio is performed. FIG. 10B shows the output voltage VOS of the downstream $O_2$ sensor 24 when feedback control of the air-fuel ratio is performed. In the method of judgement of deterioration of the three-way catalyst 14 used in the present invention, the concepts of the length of the output of the $O_2$ sensors 23 and 24 and the area of the output of the $O_2$ sensors 23 and 24 were introduced. Here, the "length" of the output of the $O_2$ sensors 23 and 24 means the length of the curve of change of the output voltage VOM and VOS when taking the output voltages VOM and VOS on the vertical axis and time on the horizontal axis as shown in FIG. 10A and FIG. 10B.

In the embodiments of the present invention, as the value representing the length of the output, use is made of the cumulative value of the amount of change of the output voltages VOM and VOS of the upstream $O_2$ sensors 23 and 24 per predetermined time. That is, the length ΣLM of the output of the upstream $O_2$ sensor 23, as shown in FIG. 10A, is expressed by the cumulative value of the absolute value $|VOM_i-VOM_{i-1}|$ of the difference between the output voltage $VOM_{i-1}$ at the time i–1 and the output voltage $VOM_i$ at the time i, while the length ΣLS of the output of the downstream $O_2$ sensor 24, as shown in FIG. 10B, is expressed by the cumulative value of the absolute value $|VOS_i-VOS_{i-1}|$ of the difference between the output voltage $VOS_{i-1}$ at the time i–1 and the output voltage $VOS_i$ at the time i.

On the other hand, the "area" of the output of the $O_2$ sensors 23 and 24 means, as shown in FIG. 10A and FIG. 10B, the area shown by the hatching enclosed by the output voltages VOM and VOS and the relative voltages $V_{R1}$ and $V_{R2}$ when taking the output voltages VOM and VOS on the vertical axis and taking time on the horizontal axis. In the embodiments of the present invention, as the value representing this area, use is made of the cumulative value of the difference between the output voltages VOM and VOS and relative voltages $V_{R1}$ and $V_{R2}$ of the $O_2$ sensors 23 and 24 for each predetermined time. That is, the area ΣAM of the output of the upstream $O_2$ sensor 23 is expressed by the cumulative value of the absolute value $|VOS_i-V_{R1}|$ of the difference between the output voltage $VOS_i$ and the relative voltage $V_{R1}$ at each time as shown in FIG. 10A, while the area ΣAS of the output of the downstream $O_2$ sensor 24 is expressed by the cumulative value of the absolute value $|VOS_i-V_{R2}|$ of the difference between the output voltage $VOS_i$ and the relative voltage $V_{R2}$ at each time as shown in FIG. 10B.

Figure 11:
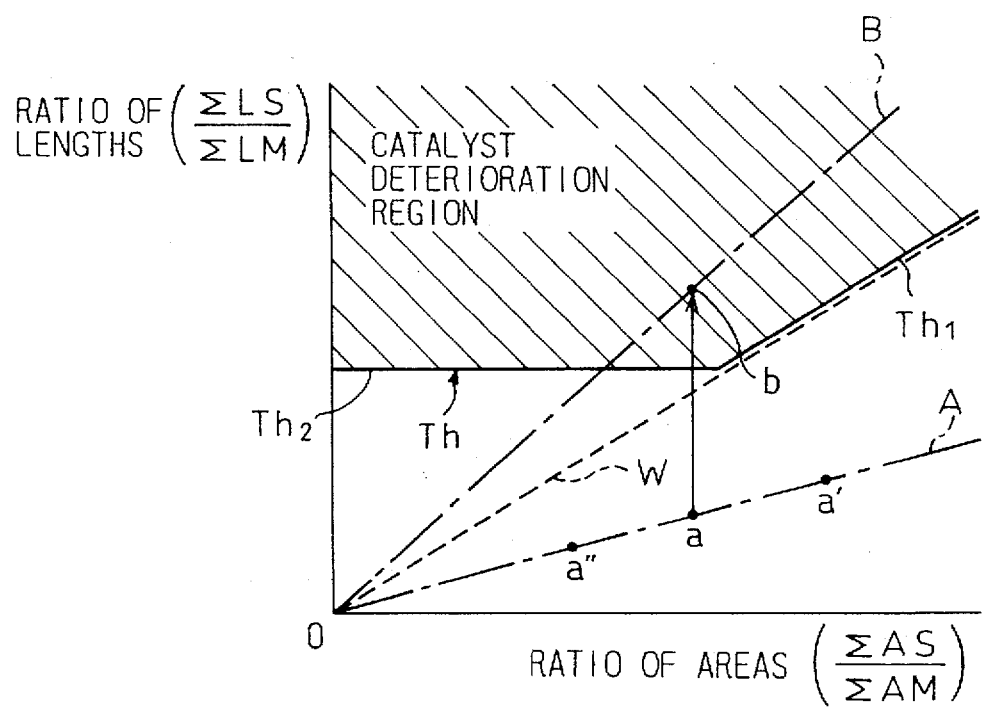
FIG. 11 is a view of the region of deterioration of the catalyst.

Further, the ratio between the length ΣLS of the output of the downstream $O_2$ sensor 24 and the length ΣLM of the output of the upstream $O_2$ sensor 23 (ΣLS/ΣLM) is defined as the ratio of length and the ratio between the area ΣAS of the output of the downstream $O_2$ sensor 24 and the area ΣAM of the output of the upstream $O_2$ sensor 23 (ΣAS/ΣAM) is defined as the ratio of area. Using the ratio of length and the ratio of area and taking the ratio of length (ΣLS/ΣLM) on the vertical axis and the ratio of area (ΣAS/ΣAM) on the horizontal axis as shown in FIG. 11, basically it can be judged that the three-way catalyst 14 is not deteriorated in the region below the broken line W shown in FIG. 11 and that the three-way catalyst 14 has deteriorated in the region above the broken line W. Next, this will be explained referring to FIG. 12A to FIG. 12C.

Figure 12A:
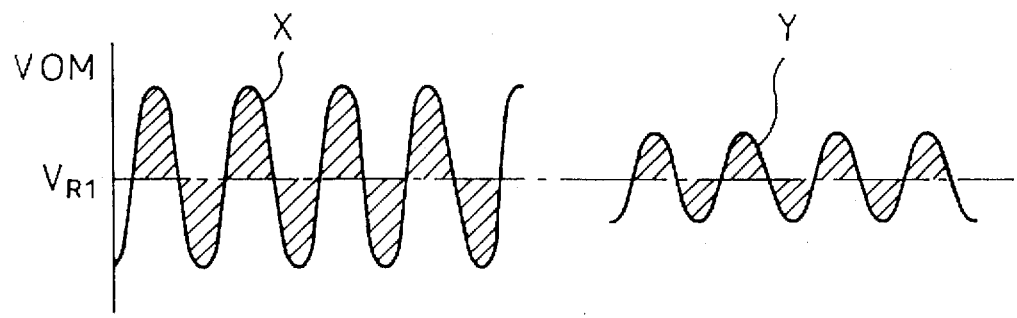
FIGS. 12A, 12B, and 12C are views of the changes in the output voltage of the $O_2$ sensor.

The curve X of FIG. 12A shows the change in the output voltage VOM of the upstream $O_2$ sensor 23 in the case where the upstream $O_2$ sensor 23 has not deteriorated. The curve X of FIG. 12B and the curve X of FIG. 12C show the change in the output voltage VOS of the downstream $O_2$ sensor 24 in the case where the downstream $O_2$ sensor 24 has not deteriorated and further the three-way catalyst 14 has not deteriorated. In this way, the relationship between the ratio of area and the ratio of length when neither of the $O_2$ sensors 23 and 24 has deteriorated and further the three-way catalyst 14 has not deteriorated either is shown by the point a of FIG. 11.

Now, if the upstream $O_2$ sensor 23 has deteriorated, the amplitude of the output voltage VOM of the upstream $O_2$ sensor 23 becomes smaller as shown by the curve Y of FIG. 12A. At this time, as understood from the curve X and curve Y of FIG. 12A, the length $\Sigma LM$ of the output becomes small and the area $\Sigma AM$ of the output becomes small in proportion to this. Accordingly, the ratio of length becomes larger and the ratio of area becomes larger in proportion to this. Therefore, at this time, the point a of FIG. 11 shifts to the point a'.

Figure 12B:
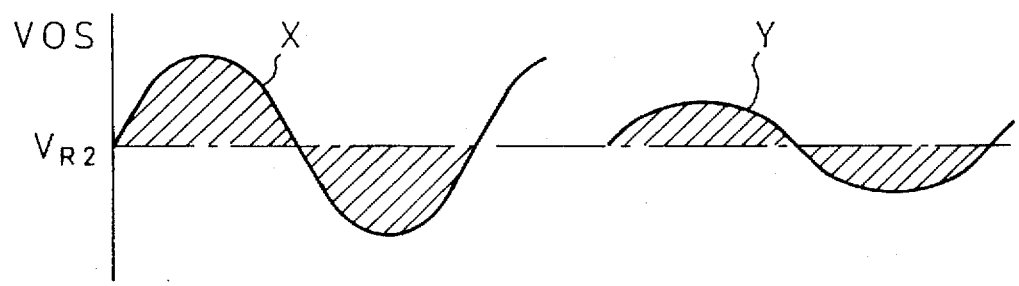
Figure 12C:
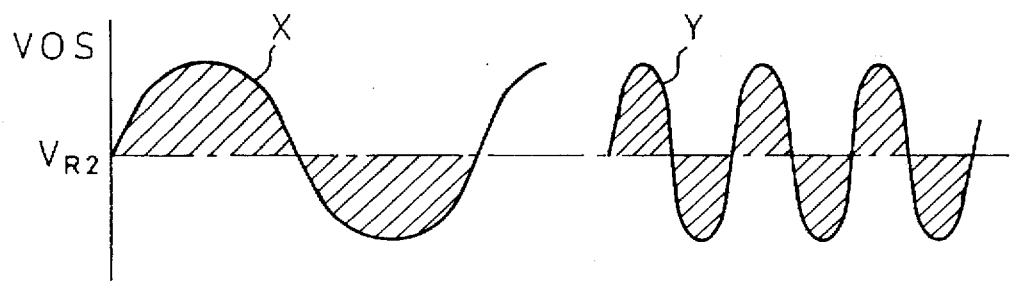

As opposed to this, if it is assumed that the downstream $O_2$ sensor 24 has deteriorated, the amplitude of the output voltage VOS of the downstream $O_2$ sensor 24 becomes smaller as shown by the curve Y in FIG. 12B. At this time, as will be understood from the curve X and the curve Y of FIG. 12B, when the length $\Sigma LS$ of the output becomes small, the area $\Sigma AS$ of the output becomes smaller as well in proportion to this. Accordingly, at this time, the ratio of length becomes smaller, the ratio of area becomes smaller in proportion to this, and therefore at this time the point a of FIG. 11 shifts to the point a".

In this way, when the $O_2$ sensors 23 and 24 deteriorate, the point showing the ratio of length and ratio of area shifts on the line A passing through the origin O.

On the other hand, when the three-way catalyst 14 deteriorates, the action of oxidation of the unburnt hydrocarbons and carbon monoxide and the action of reduction of the $NO_x$ based on the $O_2$ storage function are no longer sufficiently performed, so the air-fuel ratio on the downstream side of the three-way catalyst 14 fluctuates with a shorter period. In this case, the more the three-way catalyst 14 is deteriorated, the shorter the period of fluctuation of the output voltage VOS of the downstream $O_2$ sensor 24. When the three-way catalyst 14 ends up completely deteriorating, the output voltage VOS of the downstream $O_2$ sensor. 24 fluctuates by the same period as the output voltage VOM of the upstream $O_2$ sensor 23. The curve Y in FIG. 12C shows when the three-way catalyst 14 has deteriorated. As will be understood from the curve X and curve Y of FIG. 12C, when the three-way catalyst 14 deteriorates, the period of fluctuation of the downstream $O_2$ sensor 24 becomes shorter.

In this way, when the three-way catalyst 14 deteriorates, the period of fluctuation of the downstream $O_2$ sensor 24 becomes shorter, so the length $\Sigma LS$ of the output becomes larger. On the other hand, even when the period of fluctuation of the downstream $O_2$ sensor 24 changes, the area $\Sigma AS$ of the output within a predetermined time does not change much at all. Accordingly, if the three-way catalyst 14 deteriorates, the ratio of length becomes larger, but the ratio of area does not change much at all and thus the point a of FIG. 11 shifts to the point b. Further, if the $O_2$ sensors 23 and 24 deteriorate in the state where the three-way catalyst 14 has deteriorated, the point showing the relationship between the ratio of length and the ratio of area shifts on the line B passing through the origin O. Accordingly, as explained above, basically, if the point showing the relationship between the ratio of length and the ratio of area is positioned in the area above the line W passing through the origin O, it may be judged that the three-way catalyst 14 has deteriorated.

In actuality, however, in particular, the output voltage VOS of the downstream $O_2$ sensor 24 does not change by a clean waveform as shown in FIG. 12B and FIG. 12C. A fine vibration is superposed on the curves X and Y shown by FIG. 12B and FIG. 12C. This fine vibration does not have that great an effect on the area $\Sigma AM$ of the output of the downstream $O_2$ sensor 24, but has a larger effect on the length $\Sigma LS$ of the output the smaller the ratio of length ($\Sigma LS/\Sigma LM$). That is, if the length $\Sigma LS$ of the output is increased by exactly a certain amount due to the fine vibration superposed on the curves X and Y, the amount of increase of the ratio of length becomes larger the smaller the ratio of length. Accordingly, if it is judged that the three-way catalyst 14 has deteriorated by the line W being exceeded, when the ratio of length is small, there is a danger of mistaken judgement that the three-way catalyst 14 has deteriorated despite the three-way catalyst 14 not having deteriorated.

Therefore, in this embodiment of the present invention, as shown in FIG. 11, the threshold level Th of the judgement of deterioration of the catalyst is made the threshold level $Th_1$ matching the line W in the region where the ratio of length and ratio of area are large to a certain degree. In the region where the ratio of length and the ratio of area are small, the threshold level $Th_2$ is made a certain ratio of length. Accordingly, if the point showing the relationship between the ratio of length and the ratio of area in this embodiment of the present invention is positioned in the region above the set value in FIG. 11, that is, the threshold levels $Th_1$ and $Th_2$, it is judged that the three-way catalyst 14 has deteriorated. Note that the threshold level $Th_2$ is not derived from theory, but is determined based on experiments so that there are no mistaken judgements.

Up until now, the explanation has been made assuming that the air-fuel ratio is maintained at the stoichiometric air-fuel ratio. That is, in this embodiment of the present invention, the air-fuel ratio was controlled by a feedback operation, so theoretically the center of fluctuation of the air-fuel ratio was maintained at the stoichiometric air-fuel ratio. In actuality, however, the center of fluctuation of the air-fuel ratio is sometimes off from the stoichiometric air-fuel ratio when the operating state of the engine changes or due to other reasons. When the center of fluctuation of the air-fuel ratio is off from the stoichiometric air-fuel ratio in this way, it is preferable to be able to reliably detect the deterioration of the three-way catalyst 14. An explanation will be made of this method below.

Figure 13A:
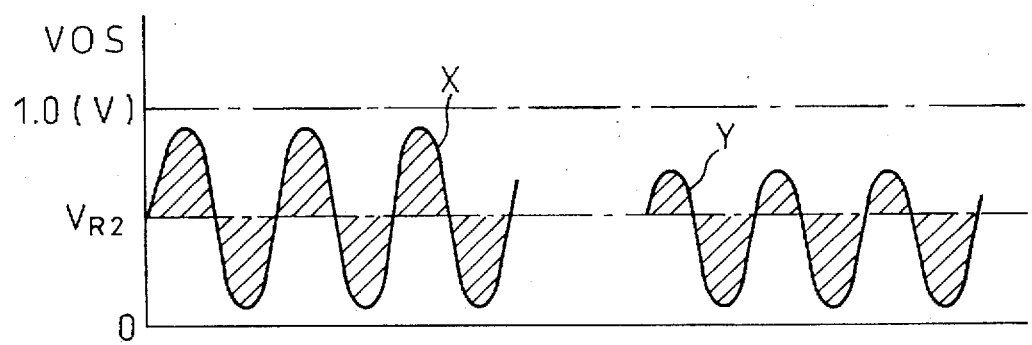
FIGS. 13A and 13B are views of the changes in the output voltage of the $O_2$ sensor.
Figure 13B:
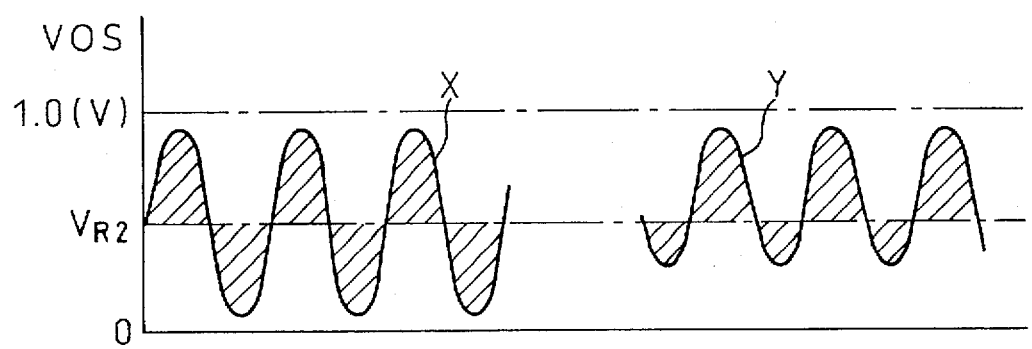

First, an explanation will be made of the change in the output voltage VOS of the downstream $O_2$ sensor 24 in the case where the center of fluctuation of the air-fuel ratio is off from the stoichiometric air-fuel ratio. The curves X in FIG. 13A and FIG. 13B show the change in the output voltage VOS of the downstream $O_2$ sensor 24 when the center of fluctuation of the air-fuel ratio is maintained at the stoichiometric air-fuel ratio. The curve Y of FIG. 13A shows the change in the output voltage VOS of the downstream $O_2$ sensor 24 in the case where the center of fluctuation of the air-fuel ratio is deviated to the lean side, while the curve Y in FIG. 13B shows the change in the output voltage VOS of the downstream $O_2$ sensor 24 in the case where the center of fluctuation of the air-fuel ratio is deviated to the rich side. From FIG. 13A and FIG. 13B, it is learned that if the center of fluctuation of the air-fuel ratio is off from the stoichiometric air-fuel ratio, the length $\Sigma LS$ of the output of the downstream $O_2$ sensor 24 and the area $\Sigma AS$ of the output both become smaller.

Figure 14:
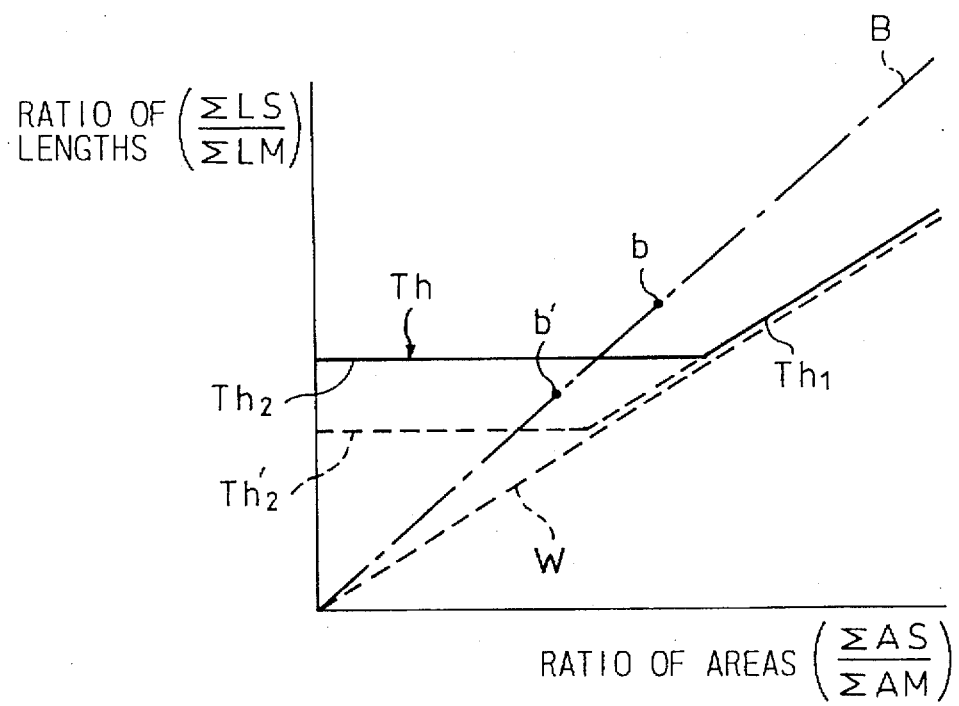
FIG. 14 is a view of the region of deterioration of the catalyst.

That is, if the point showing the relationship between the ratio of length and the ratio of area when the three-way catalyst 14 deteriorates and the center of fluctuation of the air-fuel ratio is maintained at the stoichiometric air-fuel ratio is expressed by the point b in FIG. 14, the point showing the relationship between the ratio of length and ratio of area shifts from the point b to the point b' due to the center of fluctuation of the air-fuel ratio being off from the stoichiometric air-fuel ratio. As a result, the point b' becomes in the region below the threshold level Th, so it is judged that the three-way catalyst 14 has not deteriorated despite the three-way catalyst 14 having deteriorated.

In this way, to reliably detect that the three-way catalyst 14 is deteriorated even when the center of fluctuation of the air-fuel ratio is off from the stoichiometric air-fuel ratio, when the center of fluctuation of the air-fuel ratio is off from the stoichiometric air-fuel ratio, it is necessary to lower the threshold level $Th_2$ as shown by the broken line $Th_2'$ in FIG. 14. In this case, the amount of reduction of the threshold level $Th_2$ preferably is made proportional to the amount of deviation of the air-fuel ratio from the stoichiometric air-fuel ratio. However, the amount of deviation of the air-fuel ratio is expressed as a ratio of the length $\Sigma L2$ or the area $\Sigma A2$ of the output of the downstream $O_2$ sensor 14 on the lower voltage side of the relative voltage $V_{R2}$ and the length $\Sigma L1$ or the area $\Sigma A1$ of the output of the downstream $O_2$ sensor 14 on the high voltage side of the relative voltage $V_{R2}$. As the ratio of length ($\Sigma L2/\Sigma L1$) becomes further from 1.0, the amount of deviation of the air-fuel ratio becomes larger and as the ratio of area ($\Sigma A2/\Sigma A1$) becomes further from 1.0, the amount of deviation of the air-fuel ratio becomes larger.

Figure 15A:
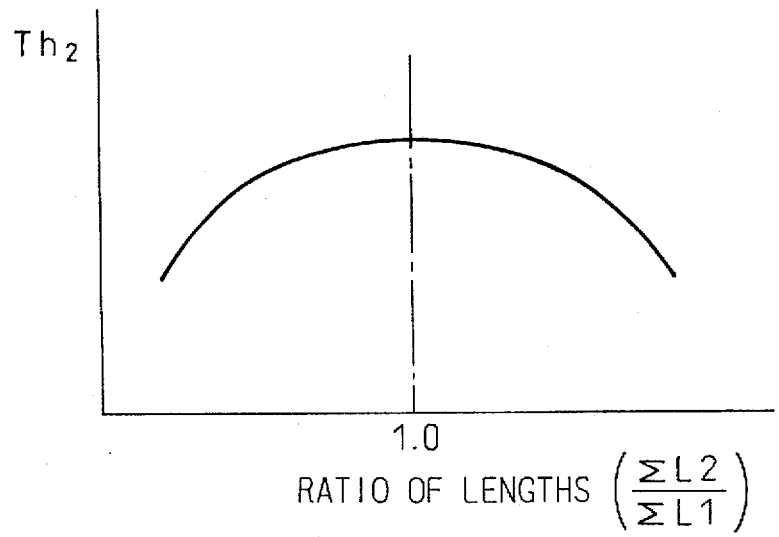
FIGS. 15A and 15B are graphs of the threshold level $Th_2$.
Figure 15B:
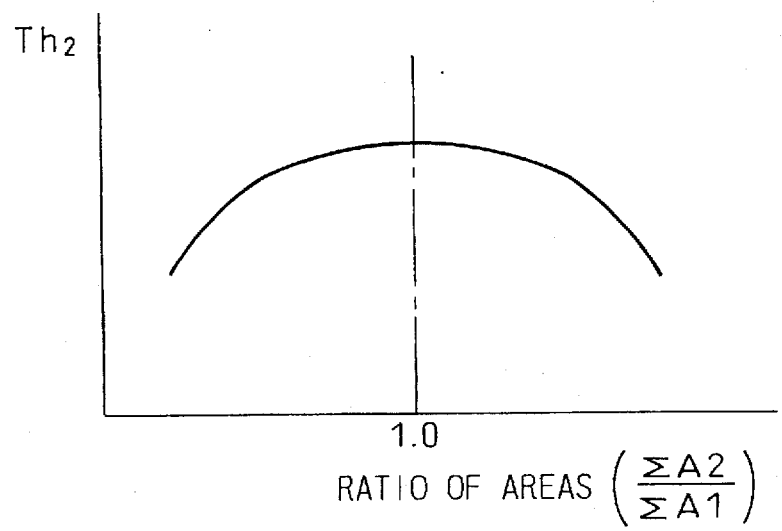

Accordingly, in the first embodiment of the present invention, as shown in FIG. 15A, the threshold level $Th_2$ is made lower as the ratio of length ($\Sigma L2/\Sigma L1$) of the output voltage VOS of the downstream $O_2$ sensor 24 becomes further from 1.0. Further, in the second embodiment of the present invention, as shown in FIG. 15B, the threshold level $Th_2$ is made lower as the ratio of area ($\Sigma A2/\Sigma A1$) of the output voltage VOS of the downstream $O_2$ sensor 24 becomes further from 1.0.

Next, an explanation will be made of a first embodiment of the routine for judgement of deterioration of the three-way catalyst 14 referring to FIG. 16 and FIG. 17. Note that this routine is executed by interruption every predetermined time interval.

Figure 17:
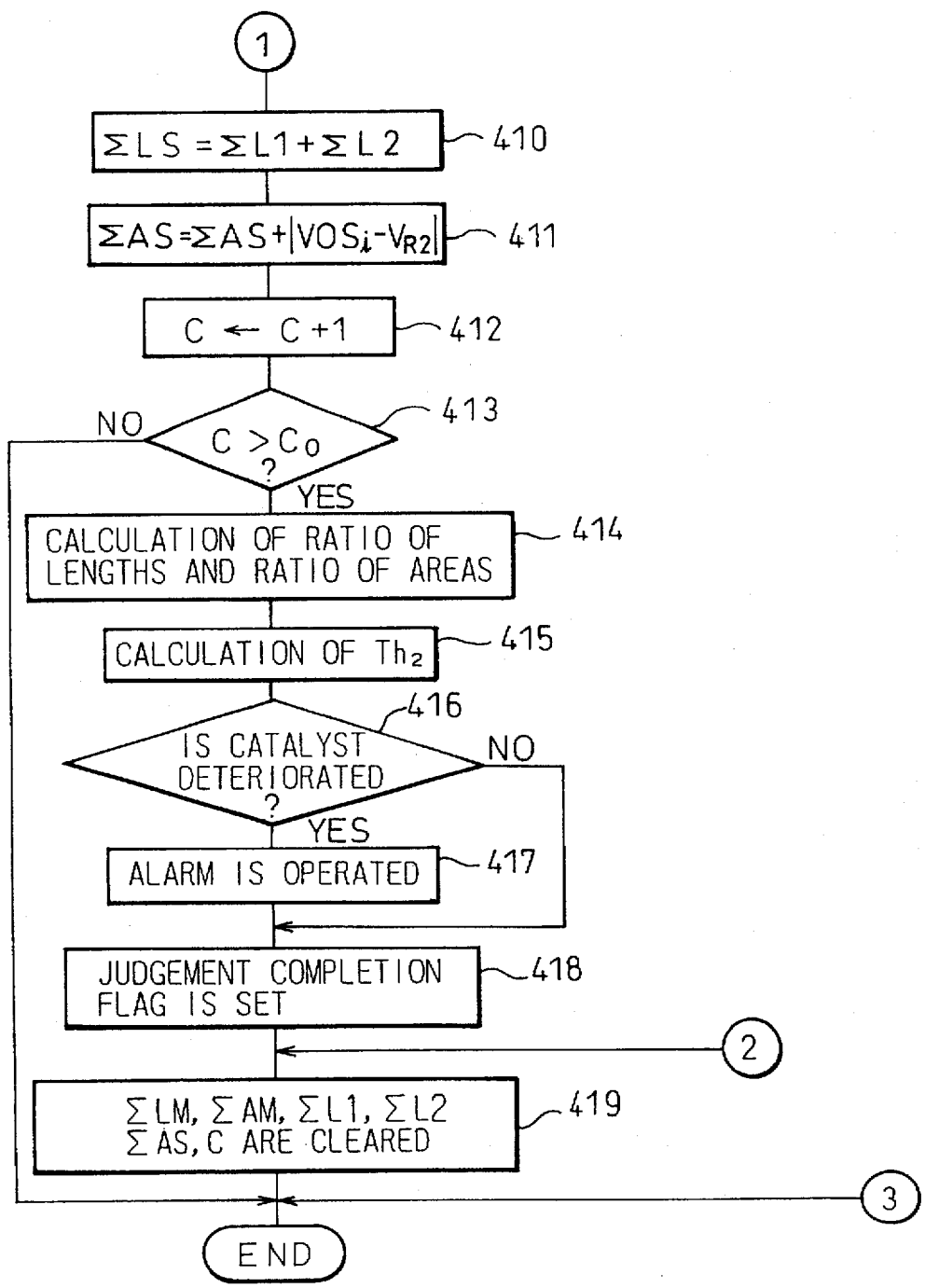

Referring to FIG. 16 and FIG. 17, first, at step 401, it is judged if the judgement completion flag showing that the judgement of deterioration has ended has been set or not. When the judgement completion flag has been set, the processing cycle is immediately ended. As opposed to this, when it is judged that the judgement completion flag has not been set, the routine proceeds to step 402, where it is judged if the air-fuel ratio feedback flag XMFB showing that feedback control of the air-fuel ratio by the upstream $O_2$ sensor 23 is being performed has been set (="1") or not. When the air-fuel ratio feedback flag XMFB has not been set (="0"), the routine jumps to step 419, where the various values involved in the judgement of deterioration are cleared. As opposed to this, when it is judged that the air-fuel ratio feedback flag XMFB has been set (="1"), the routine proceeds to step 403.

At step 403, it is judged if the air-fuel ratio feedback flag XSFB showing that feedback control of the air-fuel ratio by the downstream $O_2$ sensor 24 is being performed has been set (="1") or not. When the air-fuel ratio feedback flag XSFB has not been set (="0"), the routine jumps to step 419, while when the air-fuel ratio feedback flag XSFB has been set (="1"), the routine proceeds to step 404. At step 404, it is judged if the other conditions for judgement are satisfied. For example, it is judged that the other conditions for judgement are satisfied when the engine warmup has been completed, that is, when the temperature of the engine coolant is above a set temperature, the engine load Q/N is within a predetermined range, and the engine speed N is within a predetermined range. When the other conditions for judgement are not satisfied, the routine jumps to step 419, while when the other conditions for judgement are satisfied, the routine proceeds to step 405, where the judgement of deterioration is started.

At step 405, the processing for cumulatively adding the length $\Sigma LM$ of the output of the upstream $O_2$ sensor 23 is performed based on the following equation:

$$\Sigma LM = \Sigma LM + |VOM_i - VOM_{i-1}|$$

Next, at step 406, the processing for cumulatively adding the area $\Sigma AM$ of the output of the upstream $O_2$ sensor 23 is performed based on the following equation:

$$\Sigma AM = \Sigma AM + |VOM_i - V_{R1}|$$

Next, at step 407, it is judged if the current output voltage $VOS_i$ of the downstream $O_2$ sensor 24 is larger than the relative voltage $V_{R2}$. When $VOS_i > V_{R2}$, the routine proceeds to step 408, where the processing for cumulatively adding the length $\Sigma L1$ of the output on the high voltage side of the relative voltage $V_{R2}$ is performed based on the following equation:

$$\Sigma L1 = \Sigma L1 + |VOS_i - VOS_{i-1}|$$

As opposed to this, when $VOS_i \leq V_{R2}$, the routine proceeds to step 409, where the processing for cumulative addition of the area $\Sigma L2$ of the output of the low voltage side of the relative voltage $V_{R2}$ is performed based on the following equation:

$$\Sigma L2 = \Sigma L2 + |VOS_i - VOS_{i-1}|$$

Next, at step 410, $\Sigma L1$ and $\Sigma L2$ are added to calculate the length $\Sigma LS$ of the output of the downstream $O_2$ sensor 24. Next, at step 411, the processing for cumulatively adding the area $\Sigma AS$ of the output of the downstream $O_2$ sensor 24 is performed based on the following equation:

$$\Sigma AS = \Sigma AS + |VOS_i - V_{R2}|$$

Next, at step 412, the count C is incremented by exactly 1, then at step 413, it is judged if the count C has exceeded the set value $C_0$. When $C \leq C_0$, the processing cycle is ended. As opposed to this, when $C > C_0$, that is, when a predetermined time has elapsed from the start of the judgement of deterioration, the routine proceeds to step 414.

At step 414, the ratio of length $\Sigma LS/\Sigma LM$, ratio of length $\Sigma L2/\Sigma L1$, and ratio of area $\Sigma AS/\Sigma AM$ are calculated. Next, at step 415, the threshold level $Th_2$ is calculated from the ratio of length ($\Sigma L2/\Sigma L1$) based on the relationship shown in FIG. 15A. Next, at step 416, it is judged whether the three-way catalyst 14 has deteriorated from the relationship shown in FIG. 11 using this threshold level $Th_2$. When it is judged that the three-way catalyst 14 has not deteriorated, the routine proceeds to step 418, where the judgement completion flag is set. As opposed to this, when it is judged that the three-way catalyst 14 has deteriorated, the routine proceeds to step 417 where the alarm device 25 is actuated, then the routine proceeds to step 418.

Next, an explanation will be made of a second embodiment of the routine for judgement of deterioration of the three-way catalyst 14 referring to FIG. 18 and FIG. 19. Note that this routine is executed by interruption every predetermined time interval.

Figure 18:
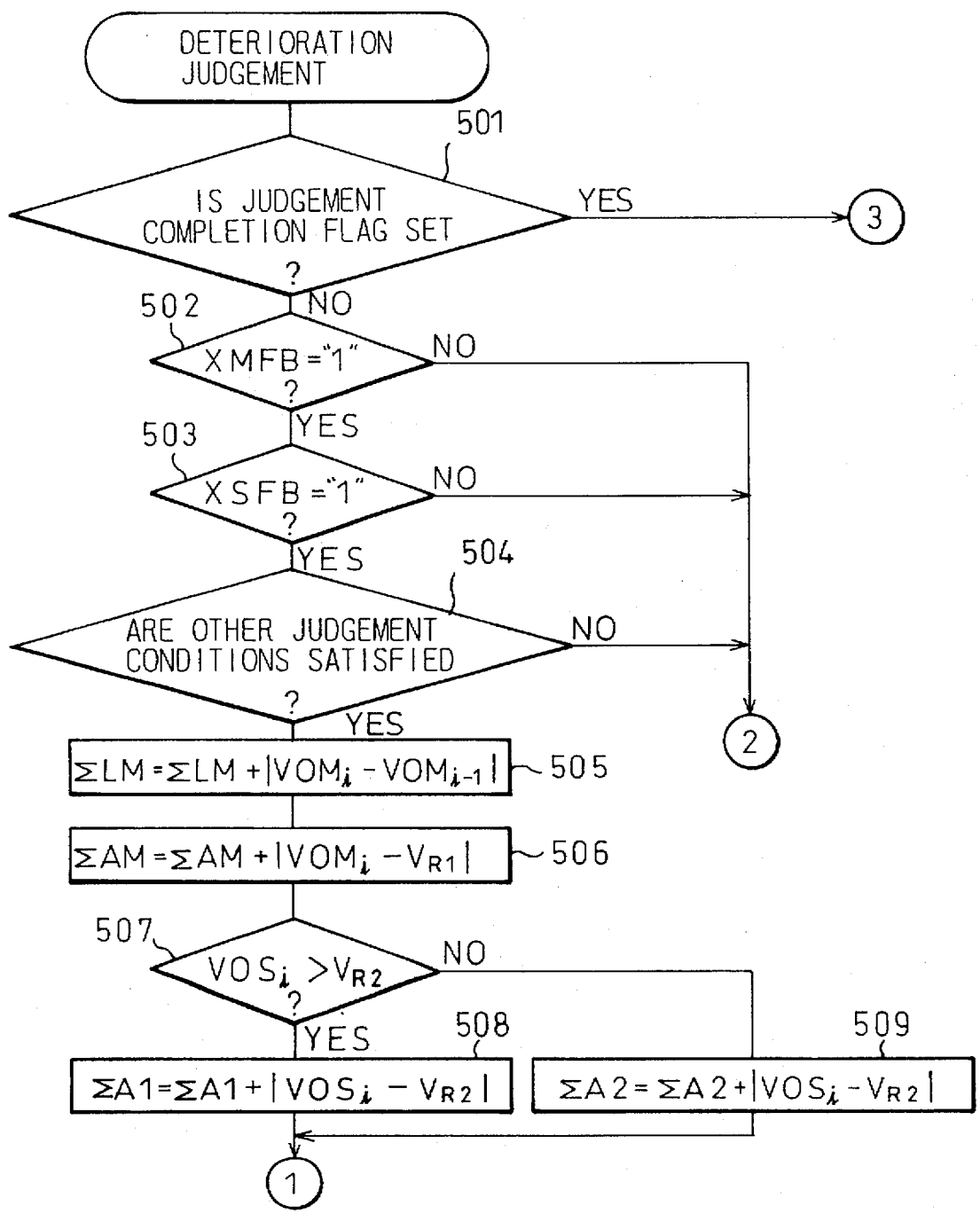
FIGS. 18 and 19 are flow charts of a second embodiment for judging the deterioration of the three-way catalyst.
Figure 19:
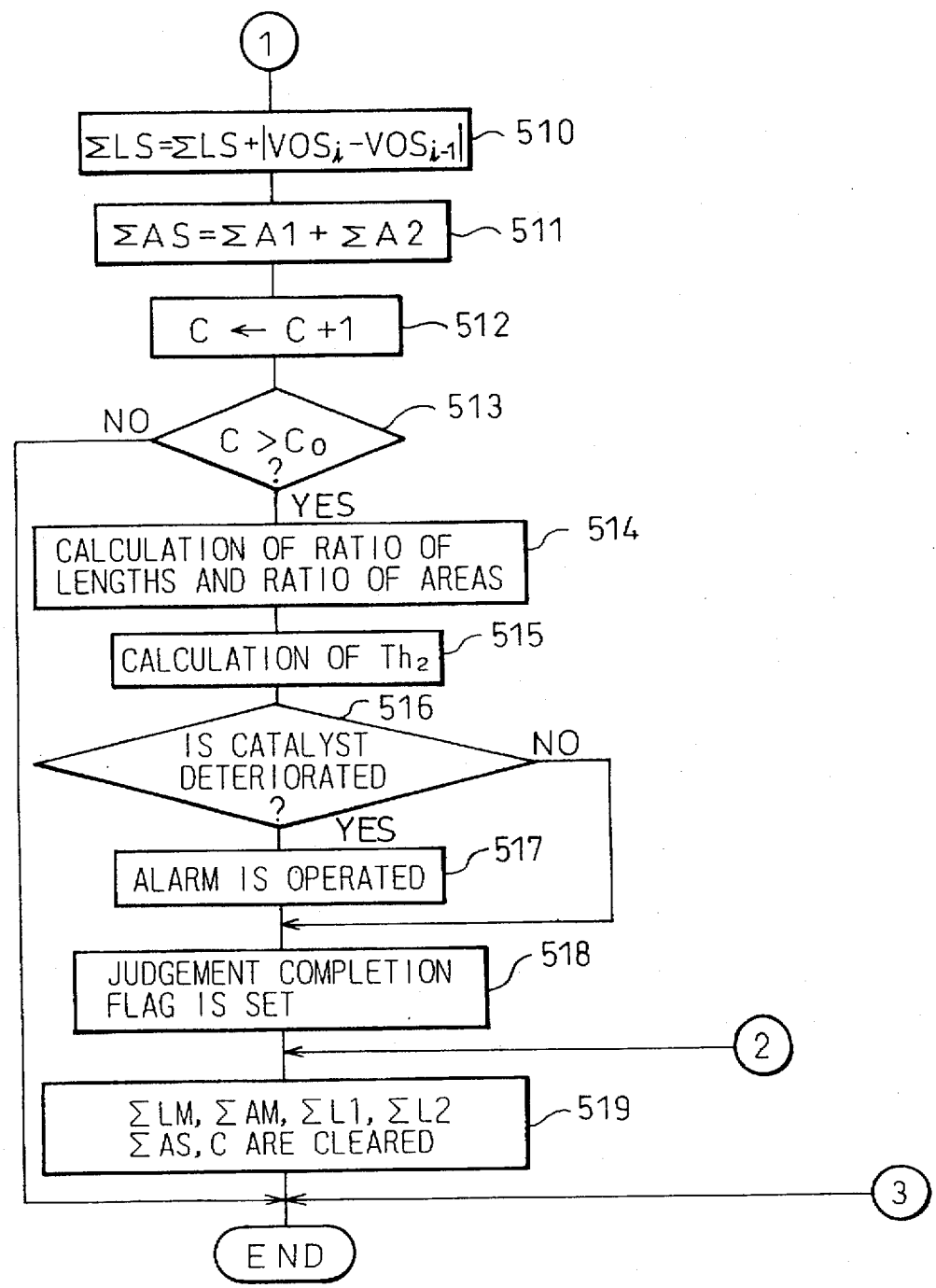

Referring to FIG. 18 and FIG. 19, first, at step 501, it is judged if the judgement completion flag showing that the judgement of deterioration has ended has been set or not. When the judgement completion flag has been set, the processing cycle is immediately ended. As opposed to this, when it is judged that the judgement completion flag has not been set, the routine proceeds to step 502, where it is judged if the air-fuel ratio feedback flag XMFB showing that feedback control of the air-fuel ratio by the upstream $O_2$ sensor 23 is being performed has been set (="1") or not. When the air-fuel ratio feedback flag XMFB has not been set (="0"), the routine jumps to step 519, where the various values involved in the judgement of deterioration are cleared. As opposed to this, when it is judged that the air-fuel ratio feedback flag XMFB has been set (="1"), the routine proceeds to step 503.

At step 503, it is judged if the air-fuel ratio feedback flag XSFB showing that feedback control of the air-fuel ratio by the downstream $O_2$ sensor 24 is being performed has been set (="1") or not. When the air-fuel ratio feedback flag XSFB has not been set (="0"), the routine jumps to step 519, while when the air-fuel ratio feedback flag XSFB has been set (="1"), the routine proceeds to step 504. At step 504, it is judged if the other conditions for judgement are satisfied. For example, it is judged that the other conditions for judgement are satisfied when the engine warmup has been completed, that is, when the temperature of the engine coolant is above a set temperature, the engine load Q/N is within a predetermined range, and the engine speed N is within a predetermined range. When the other conditions for judgement are not satisfied, the routine jumps to step 519, while when the other conditions for judgement are satisfied, the routine proceeds to step 505, where the judgement of deterioration is started.

At step 505, the processing for cumulatively adding the length $\Sigma LM$ of the output of the upstream $O_2$ sensor 23 is performed based on the following equation:

$$\Sigma LM=\Sigma LM+|VOM_i-VOM_{i-1}|$$

Next, at step 506, the processing for cumulatively adding the area $\Sigma AM$ of the output of the upstream $O_2$ sensor 23 is performed based on the following equation:

$$\Sigma AM=\Sigma AM+|VOM_i-V_{R1}|$$

Next, at step 507, it is judged if the current output voltage $VOS_i$ of the downstream $O_2$ sensor 24 is larger than the relative voltage $V_{R2}$. When $VOS_i>V_{R2}$, the routine proceeds to step 508, where the processing for cumulatively adding the area $\Sigma A1$ of the output on the high voltage side of the relative voltage $V_{R2}$ is performed based on the following equation:

$$\Sigma A1=\Sigma A1+|VOS_i-V_{R1}|$$

As opposed to this, when $VOS_i \leq V_{R2}$, the routine proceeds to step 509, where the processing for cumulative addition of the area $\Sigma A2$ of the output of the low voltage side of the relative voltage $V_{R2}$ is performed based on the following equation:

$$\Sigma A2=\Sigma A2+|VOS_i-V_{R2}|$$

Next, at step 510, the processing for cumulative addition of the length $\Sigma L2$ of the output of the downstream $O_2$ sensor 24 is performed based on the following equation:

$$\Sigma LS=\Sigma LS+|VOS_i-VOS_{i-1}|$$

Next, at step 511, $\Sigma A1$ and $\Sigma A2$ are added to calculate the area $\Sigma AS$ of the output of the downstream $O_2$ sensor 24. Next, at step 512, the count C is incremented by exactly 1, then at step 513, it is judged if the count C has exceeded the set value $C_0$. When $C \leq C_0$, the processing cycle is ended. As opposed to this, when $C>C_0$, that is, when a predetermined time has elapsed from the start of the judgement of deterioration, the routine proceeds to step 514.

At step 514, the ratio of length $\Sigma LS/\Sigma LM$, ratio of area $\Sigma AS/\Sigma AM$, and ratio of area $\Sigma A2/\Sigma A1$ are calculated. Next, at step 515, the threshold level $Th_2$ is calculated from the ratio of area ($\Sigma A2/\Sigma A1$) based on the relationship shown in FIG. 15B. Next, at step 516, it is judged whether the three-way catalyst 14 has deteriorated from the relationship shown in FIG. 11 using this threshold level $Th_2$. When it is judged that the three-way catalyst 14 has not deteriorated, the routine proceeds to step 518, where the judgement completion flag is set. As opposed to this, when it is judged that the three-way catalyst 14 has deteriorated, the routine proceeds to step 517 where the alarm device 25 is actuated, then the routine proceeds to step 518.

In this way, in the present invention, it is possible to reliably detect the deterioration of the catalyst even when the center of fluctuation of the air-fuel ratio is off from the stoichiometric air-fuel ratio.

While the invention has been described by reference to specific embodiments chosen for purposes of illustration, it should be apparent that numerous modifications could be made thereto by those skilled in the art without departing from the basic concept and scope of the invention.

I claim:

1. A device for judging the deterioration of a three-way catalyst arranged in exhaust passage of an engine in which an air-fuel ratio is controlled by feedback operation so that it becomes equal to the stoichiometric air-fuel ratio, said device comprising a downstream air-fuel ratio sensor arranged in the exhaust passage downstream of the three-way catalyst;

fluctuation calculating means for calculating an amount of fluctuation of sensor output, which changes in accordance with a change in the amount of fluctuation of an output of said downstream air-fuel ratio sensor and increases as the three-way catalyst deteriorates;

deterioration judging means for judging that the three-way catalyst deteriorates when the amount of fluctuation of the sensor output exceeds a predetermined amount of fluctuation;

air-fuel ratio deviation judging means for judging whether or not a mean value of the air-fuel ratio deviates from the stoichiometric air-fuel ratio; and controlling means for controlling the predetermined amount of fluctuation on the basis of a judgement by the air-fuel ratio deviation judging means to lower the predetermined amount of fluctuation when the mean value of the air-fuel ratio deviates from the stoichiometric air-fuel ratio.

2. A device as set forth in claim 1, comprising an upstream air-fuel ratio sensor arranged in the exhaust passage upstream of the three-way catalyst and length ratio calculating means for calculating a ratio of length which represents a ratio of length of the output signal response curve of said downstream air-fuel ratio sensor with respect to the length of the output signal response curve of said upstream air-fuel ratio sensor and wherein the amount of fluctuation of said sensor output and said predetermined amount of fluctuation are expressed by the ratio of length.

3. A device as set forth in claim 2, wherein area ratio calculating means is provided for calculating a ratio of area of output of said downstream air-fuel ratio sensor with respect to the area of the output of said upstream air-fuel ratio sensor, the predetermined amount of fluctuation being made a first ratio of length which becomes larger the greater the ratio of area when said ratio of area is larger than a predetermined value, the predetermined amount of fluctuation being made a substantially constant second ratio of length when the ratio of area is smaller than the predetermined value, said controlling means reducing the second ratio of length when the mean value of the air-fuel ratio is off from the stoichiometric air-fuel ratio.

4. A device as set forth in claim 1, wherein the air-fuel ratio deviation judging means judges if the air-fuel ratio is off from the stoichiometric air-fuel ratio from the fluctuation of the output of the downstream air-fuel ratio sensor.

5. A device as set forth in claim 4, wherein ratio calculating means is provided for calculating the ratio of the length of the output signal response curve of the downstream air-fuel ratio sensor when the output signal response curve of the downstream air-fuel ratio sensor is more than a predetermined reference value and the length of the output signal response curve of the downstream air-fuel ratio sensor when the output of the downstream air-fuel ratio sensor is less than the predetermined reference value, and said air-fuel ratio deviation judging means judges that the air-fuel ratio is off from the stoichiometric air-fuel ratio when the ratio is off from 1.0.

6. A device as set forth in claim 5, wherein said controlling means increases the amount of reduction of the predetermined amount of fluctuation the more the ratio is off from 1.0.

7. A device as set forth in claim 4, wherein ratio calculating means is provided for calculating the ratio of the area of the output of the downstream air-fuel ratio sensor when the output of the downstream air-fuel ratio sensor is more than a predetermined reference value and the area of the output of the downstream air-fuel ratio sensor when the output of the downstream air-fuel ratio sensor is less than the predetermined reference value, and said air-fuel ratio deviation judging means judges that the air-fuel ratio is off from the stoichiometric air-fuel ratio when the ratio is off from 1.0.

8. A device as set forth in claim 7, wherein said controlling means increases the amount of reduction of the predetermined amount of fluctuation the more the ratio is off from 1.0.

* * * * *